(No Model.) 2 Sheets—Sheet 1.
C. E. EMERY.
PLANIMETER.
No. 360,867. Patented Apr. 12, 1887.
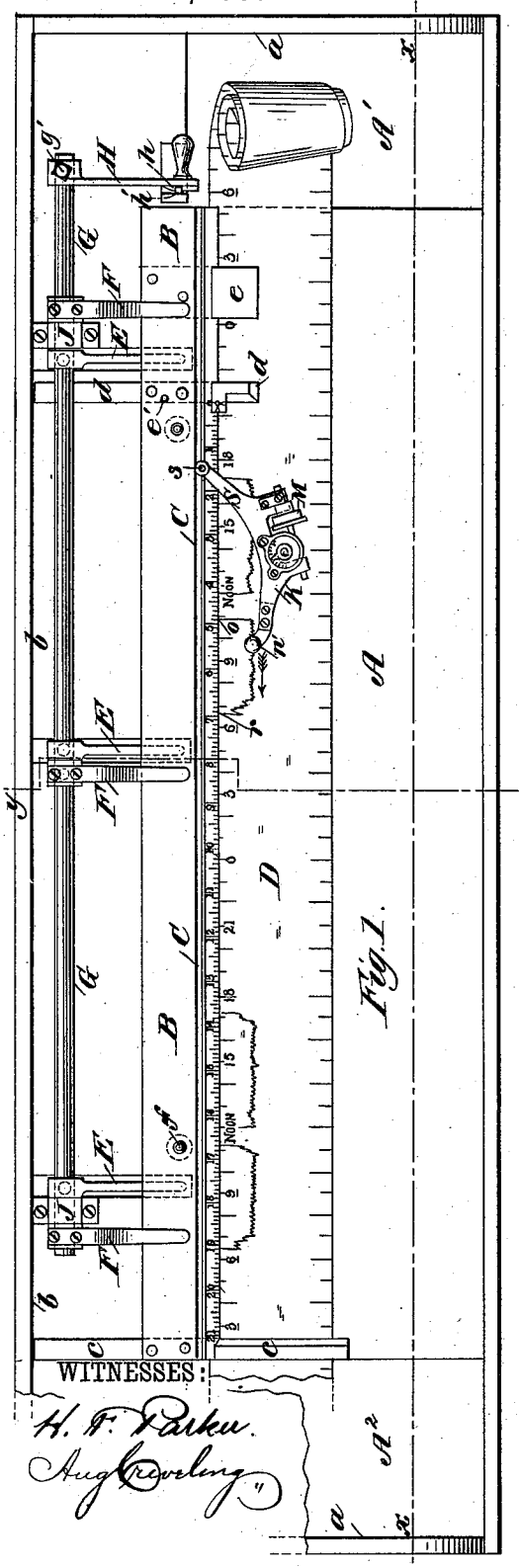
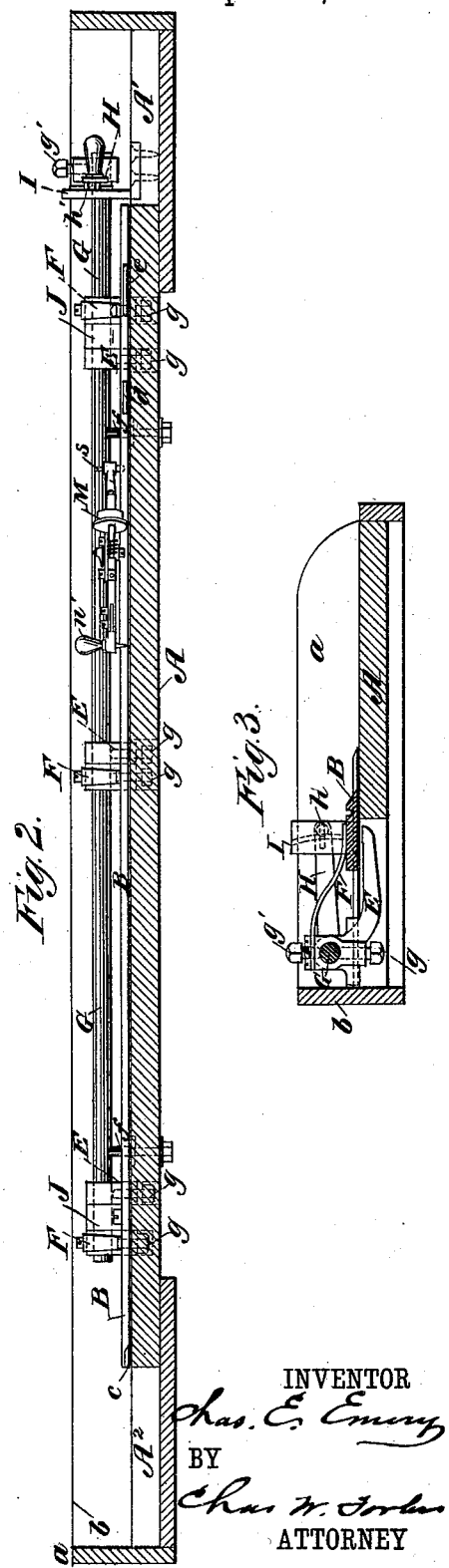
WITNESSES:
H. F. Parker.
Aug Creveling
INVENTOR
Chas. E. Emery
BY
Chas. W. Forbes
ATTORNEY (No Model.)   2 Sheets—Sheet 2.

C. E. EMERY.
PLANIMETER.

No. 360,867.   Patented Apr. 12, 1887.

WITNESSES:
H. F. Parker.
Aug Greveling

INVENTOR
Chas. E. Emery
BY
Chas. N. Forkin
ATTORNEY

N. PETERS, Photo-Lithographer, Washington, D. C.

UNITED STATES PATENT OFFICE.

CHARLES E. EMERY, OF BROOKLYN, NEW YORK.

PLANIMETER.

SPECIFICATION forming part of Letters Patent No. 360,867, dated April 12, 1887.

Application filed June 24, 1886. Serial No. 206,161. (No model.)

*To all whom it may concern:*

Be it known that I, CHARLES E. EMERY, a citizen of the United States, residing at Brooklyn, in the county of Kings and State of New York, have invented certain new and useful Improvements in Planimeters, of which the following is a specification.

The invention consists in certain improved mechanism in planimeters, whereby a special adaptation of previously-known instruments is secured to integrate meter-charts of an elongated or continuous pattern which are produced from a meter from which the volume of steam or other fluid consumption is graphically registered. This adaptation of the instrument comprises improvements in its construction which will facilitate and extend its capacity for measuring and indicating the superficial contents of such charts, and for ascertaining the mean heights of the diagrams thereon.

My improved planimeter is also well adapted for measuring large areas, and may be also used to ascertain the mean pressure of indicator-cards, otherwise known as "averaging," but is more particularly adapted to the purpose specified.

Figure 4:
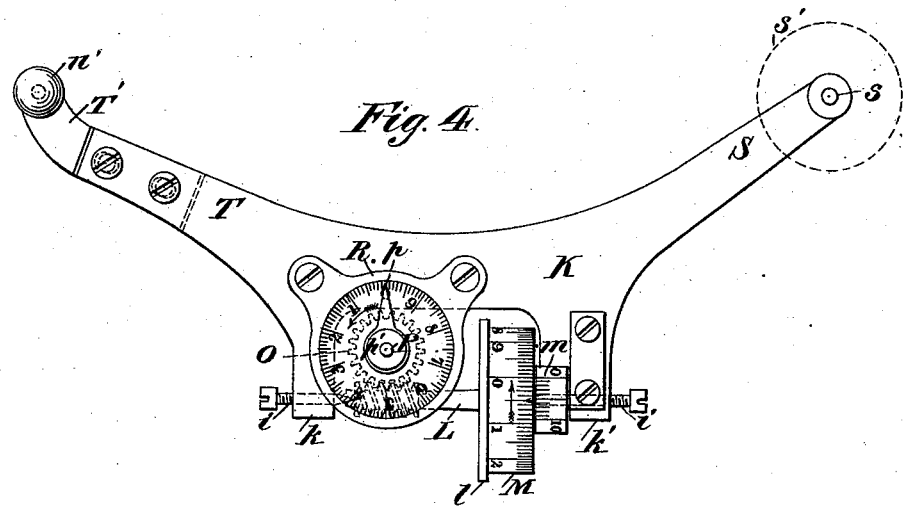
Figure 5:
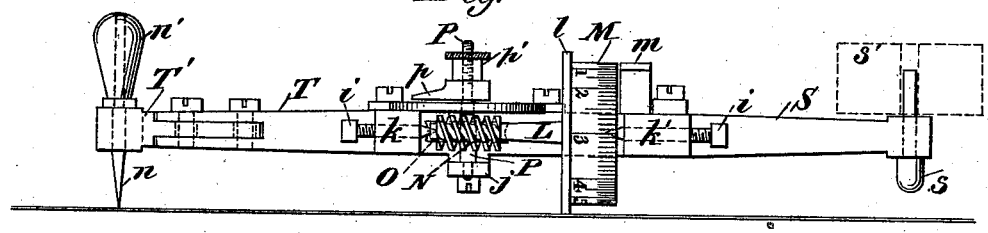
Figure 6:

Having reference to the accompanying drawings, which form a part of this specification, and in which like letters indicate like parts throughout, Figure 1 is a plan view of the complete apparatus; Fig. 2, a vertical longitudinal section of the line $x\,x$ of Fig. 1, and Fig. 3 a vertical transverse section thereof on the line $y\,y$. Fig. 4 is an enlarged plan view of the measuring and registering mechanism, and Fig. 5 is a front elevation thereof. Fig. 6 is a cross-section of the guide-ruler, drawn on a scale corresponding with Figs. 4 and 5; and Fig. 7, a modification of the same.

A is a portable tray or table, of wood, having depressions $A'\,A^2$ at either end, and finished with suitable sides, $a\,a$, and back $b$. Upon this tray or table is placed a long guide-ruler, B, of thin steel or other suitable material, having upon its face a groove, C, cut its entire length near the guiding-edge thereof and parallel thereto, for the purpose of receiving and guiding a downwardly-projecting stud, $s$, of the planimeter-arm as the latter is moved to and fro. The guide-ruler B furthermore serves as a clamp for the paper D, and is provided with cross-pieces of metal $c\,d\,e$, the pieces $c$ and $d$ extending backward against the back board, $b$, to assist in steadying the ruler when raised, and extending forward across or partially across the paper to assist as clamps, and having chamfered edges, which are cut at a right angle to the edge of the guide-ruler B, to serve as guides for the tracing-point of the planimeter in measuring a diagram of greater length than the capacity of the guide-ruler.

The cross-piece $e$ is designed to afford a support for the wheel of the planimeter and the center punch-mark, $e'$, for the tracing-point thereof when the planimeter is at rest, and for convenience in lifting the whole to substitute or move the paper. To facilitate this manipulation, the guide-ruler is lifted by one movement and clamped by another movement by means of the lifting-arms E and depressing-springs F, adjustably secured to the shaft G by means of suitable set-screws, $g$, said shaft being provided at one end with a crank, H, slightly flexible, and having a tongue, $h$, which engages with the studs or notches $h$ on the standard I, whereby said crank-shaft and springs are held in either position. The shaft G is mounted in bearings J, which are attached to the board A. The guide-ruler B rests loosely over two or more guide-pins, $f$, projecting upward from the board, which assist in keeping it properly in place.

Having reference to Figs. 4 and 5, which illustrate, on an enlarged scale, the construction of the measuring-wheel mechanism in detail, the frame K is provided with lugs $k\,k'$, on which are journaled the ends of the arbor L of the measuring-wheel M. To secure the requisite delicacy of the instrument, the arbor L is journaled between the steel points of the screws $i$, which permit the removal or taking up of wear of said arbor. Upon the arbor L is also secured a worm, N, which, in this instance, is double threaded and engages with a worm-wheel, O, having twenty teeth, whereby said worm-wheel O, spindle P, and index-hand $p$ are caused to turn one revolution to every ten of the measuring-wheel M. The lower end of the spindle P is journaled upon the piece $j$, attached beneath the frame K, and its upper bearing is in the dial-plate R, also secured to the frame K.

At the upper end of the spindle P, and upon a suitable shoulder, is loosely fitted the index-hand p, whereby its proper setting is facilitated by the adjustment of the milled nut p'; or the index-hand may be mounted with a taper fitting and set by frictional contact with said spindle. The flange l of the measuring-wheel is of hard steel, and ground to a facet edge, presenting a smooth and narrow periphery of certain accurate diameter. Upon the broader face of this wheel a scale is provided, which is divided into ten equal parts, such parts indicating square inches, which are subdivided into tenths, and provided with a vernier, m, whereby the reading is extended to hundredths. The dial-plate R is divided into ten equal parts, also subdivided into tenths, the said dial having a registering capacity of one hundred square inches.

Figure 7:
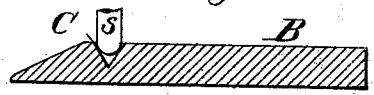

The arm S of the frame K is provided beneath its extremity with the downwardly-projecting stud s, having its end rounded or ball-shaped, and fitted to run smoothly and accurately in the groove C of the guide-ruler B. The groove C is preferably of semicircular cross-section, with its bottom cut out, as shown in Fig. 6, to prevent bottoming of the ball and insure the firm contact of the latter with both sides of the groove. The groove may, however, be made of V-shaped section, as shown in Fig. 7.

In the use of a cylindrical stud in a groove with parallel sides the stud readily jams in the groove on attempting to lift the instrument from the paper, and rapidly wears, so that there is no certainty that the rear end of the planimeter arm will be returned in exactly the same path of its forward movement, which is a condition essential to the accuracy of any planimeter. The stud s is furthermore kept in the groove by aid of a small weight, s', which is dropped over its upper end, as indicated by dotted lines. The arm T of the frame K is divided at its extremity to receive the tongue of its extension T', which is slightly adjustable by means of the set-screws shown, whereby the registering accuracy of the measuring-wheel may be corrected or counteracted in the instance of wear. The extension T' of the arm T carries the tracing-point n, provided with the swiveled handle n'.

The operation of the apparatus is as follows: The roll of paper upon which one or more meter-charts have been produced is dropped into the depression A' at one end of the tray, Fig. 1, and extended across the board to the depression at the other end. The guide-ruler B is then lifted slightly by means of the crank H and arms E, the edge of the paper placed under said rule to meet an established base-line of the diagram, which is usually about one-fourth of an inch from the edge of the paper, and which must coincide with the edge of the guide-rule. The ruler is then clamped down by springs F, and held by crank H engaging with studs h. The planimeter is then placed at the right with the guide-studs s in the groove C, and the tracer n at the starting-point o of the diagram. The wheel M is now lifted nearly or quite out of contact with the paper and turned until its zero-mark coincides with the zero-mark of the vernier. It is then allowed to engage with the paper, and while thus remaining the index-hand p is set to the zero-mark of the dial R, and the instrument is ready for work.

The operator moves the tracer n by means of the swiveled handle n' first toward him, following carefully the line scribed, thence and to the left in the direction of the arrow, arriving at the point r. From this point the tracer is returned along the edge of the ruler to the starting-point o, the latter movement reversing the revolution of the measuring-wheel M, produced by its frictional contact with the paper. This operation completed, the superficial contents in square inches contained within the diagram traced are immediately read from the planimeter-scale without additional calculation. Of the resulting figures the tens are read from the dial R, the units and fractional tenths thereof from the wheel M, and hundredths from the vernier m.

The ruler B is provided at its edge with a scale of inches, subdivided into tenths, engraved thereon. From this scale can be read readily the lengths of the several diagrams and fractions of diagrams in view between the guide-pieces c d, Fig. 1, and, evidently, by dividing the area of each diagram as read from the planimeter indices by its length the result will give the mean height of such diagram, and by dividing the total area shown by the planimeter indices for the areas exposed to view by the sum of the lengths of such diagrams, the result will be the mean height of the several diagrams taken collectively.

It will be observed that the roll of paper shown in the accompanying drawings is divided into a scale representing hours, whereby the period of consumption may be noted.

The rule B may be removed from the board and laid directly upon a drawing showing any irregular figure of which it is desired to obtain the area. In such case the operator should commence measuring such area at one end, laying the rule with the graduated edge a few inches from the boundary, and drawing a pencil-line along it. The planimeter should then be run along the rule and around the irregular border, thus measuring the area within the limits of the length of the rule. Then the rule may be moved back a few inches, and the area ascertained between the rule and the pencil-line previously drawn, another pencil-line drawn along the rule, and the latter again moved, until the entire figure has been gone over, when its total area will be readily found by summing the several areas shown by the instrument. In instruments made specially for the purpose of measuring large areas, the arms c d e would be omitted, leaving practically a plain rule with a groove parallel to the edge for the purpose of guiding the planimeter.

I claim as my invention—

1. A planimeter having a globular guide-stud, *s*, in combination with a ruler having the concave or V-shaped guide-groove C, in which said guide-stud moves to secure freedom of movement of the stud in the groove and prevent slack motion under all conditions of wear.

2. In a planimeter, the combination of a plane or board and guide-ruler with a lifting and depressing device for manipulating said guide-ruler, comprising a shaft, G, arms E, springs F, crank and notches H *h*, substantially as shown, and for the purposes herein described.

3. A planimeter having a guide-stud, in combination with a portable ruler having a guide-groove in which said guide-stud moves, whereby large figures may be measured in divided areas, substantially in the manner specified.

CHAS. E. EMERY.

Witnesses:
E. W. CLARK,
R. M. REEVS.